(12) United States Patent
Nakanishi (10) Patent No.: US 9,139,146 B2
(45) Date of Patent: Sep. 22, 2015

(54) IMPACT ABSORBING MEMBER FOR VEHICLE

(71) Applicant: Makoto Nakanishi, Toyota (JP)

(72) Inventor: Makoto Nakanishi, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/390,892

(22) PCT Filed: Sep. 20, 2012

(86) PCT No.: PCT/JP2012/074098
§ 371 (c)(1),
(2) Date: Oct. 6, 2014

(87) PCT Pub. No.: WO2013/150671
PCT Pub. Date: Oct. 10, 2013

(65) Prior Publication Data
US 2015/0061307 A1    Mar. 5, 2015

(30) Foreign Application Priority Data

Apr. 5, 2012 (JP) ................................. 2012-086826

(51) Int. Cl.
*B60R 19/34* (2006.01)
*F16F 7/12* (2006.01)

(52) U.S. Cl.
CPC .. *B60R 19/34* (2013.01); *F16F 7/12* (2013.01)

(58) Field of Classification Search
CPC ..................................................... B60R 19/34
USPC ..................................... 296/187.09; 293/133
See application file for complete search history.

(56) References Cited

U.S. PATENT DOCUMENTS

| 2005/0179268 | A1* | 8/2005 | Kollaritsch et al. | ........... 293/133 |
| 2007/0056819 | A1 | 3/2007 | Kano et al. | |
| 2007/0176443 | A1* | 8/2007 | Yasuhara et al. | ............... 293/133 |
| 2010/0219031 | A1 | 9/2010 | Kano | |
| 2011/0285152 | A1* | 11/2011 | Kwon et al. | ................... 293/102 |
| 2014/0125073 | A1* | 5/2014 | Yamada et al. | ............... 293/133 |

FOREIGN PATENT DOCUMENTS

JP  A-2005-153567    6/2005
WO  WO 2007/029362 A1    3/2007

OTHER PUBLICATIONS

Jan. 8, 2013 International Search Report issued in International Application No. PCT/JP2012/074098.

* cited by examiner

*Primary Examiner* — Jason S Morrow
(74) *Attorney, Agent, or Firm* — Oliff PLC (57) ABSTRACT

A vehicular impact absorber including: a hollow tubular body having a plurality of flat plate-shaped side walls and having a polygonal section; and a vehicle body-side attachment plate that is fixed integrally with the tubular body via a bracket in a state where the vehicle body-side attachment plate is in contact with one end portion of the tubular body in an axial direction, the vehicular impact absorber being fixed at the vehicle body-side attachment plate to a vehicle body-side member, and the vehicular impact absorber absorbing impact energy as the tubular body is crushed in the axial direction when an impact load is applied to the tubular body through the other end portion of the tubular body in the axial direction, the vehicular impact absorber being configured such that the bracket has a fixed plate portion that has a prescribed length in the axial direction of the tubular body.

3 Claims, 9 Drawing Sheets

IMPACT ABSORBING MEMBER FOR VEHICLE

TECHNICAL FIELD

The invention relates generally to a vehicular impact absorber, and more specifically to an improvement in a structure for fixing one end portion of a tubular body to a vehicle body-side attachment plate.

BACKGROUND ART

There is a known vehicular impact absorber including (a) a hollow tubular body having a plurality of flat plate-shaped side walls and having a polygonal section, and (b) a vehicle body-side attachment plate that is fixed integrally with the tubular body via a bracket in a state where the vehicle body-side attachment plate is in contact with one axial end portion of the tubular body, (c) the vehicular impact absorber being fixed at the vehicle body-side attachment plate to a vehicle body-side member, and the vehicular impact absorber absorbing impact energy as the tubular body is crushed in the axial direction when an impact load is applied to the tubular body through the other axial end portion of the tubular body. A vehicular impact absorber illustrated in FIG. 12(a) in Patent Document 1 is an example of the above-described vehicular impact absorber, and a plurality of side walls of a tubular body is fixed with the use of a plurality of brackets bent into an L-shape. Further, FIG. 5 in Patent Document 2 illustrates a technique for fitting and joining an outer member having a rectangular tubular shape onto the outer side of a tubular body.

RELATED ART DOCUMENTS

Patent Documents

Patent Document 1: WO 2007/029362
Patent Document 2: Japanese Patent Application Publication No. 2005-153567

SUMMARY OF THE INVENTION

Problems to be Solved by the Invention

However, with the technique described in Patent Document 1, sufficient fixation strength is not obtained because the plurality of side walls of the tubular body are individually fixed with the use of the plurality of brackets. Thus, deformation of the tubular body in the latter half of compressive deformation becomes unstable and prescribed impact energy absorption performance is not obtained in some cases. With the technique described in Patent Document 2, sufficient fixation strength is obtained because the whole circumference of the tubular body is supported by the outer member. However, deformation of the tubular body is inhibited at a portion surrounded by the outer member, and thus a compression stroke at which appropriate impact energy absorption performance is obtained is shortened.

The invention is made in the light of the above-described circumstances, and an object of the invention is to allow a tubular body to be appropriately deformed until the latter half of compressive deformation, thereby making it possible to stably obtain prescribed impact energy absorption performance until the end while ensuring a sufficient compression stroke.

Means for Solving the Problem

To achieve the object, the first aspect of the invention provides a vehicular impact absorber comprising: (a) a hollow tubular body having a plurality of flat plate-shaped side walls and having a polygonal section; and (b) a vehicle body-side attachment plate that is fixed integrally with the tubular body via a bracket in a state where the vehicle body-side attachment plate is in contact with one end portion of the tubular body in an axial direction, (c) the vehicular impact absorber being fixed at the vehicle body-side attachment plate to a vehicle body-side member, and the vehicular impact absorber absorbing impact energy as the tubular body is crushed in the axial direction when an impact load is applied to the tubular body through the other end portion of the tubular body in the axial direction, the vehicular impact absorber characterized in that (d) the bracket has (d-1) a fixed plate portion that has a prescribed length in the axial direction of the tubular body, that is disposed so as to be in close contact with and fixed integrally with outer faces of the plurality of side walls located adjacent to each other across a ridge portion of the tubular body, and that has a corner portion bent so as to conform to the ridge portion of the tubular body, and (d-2) a connecting plate portion that is bent from an end portion of the fixed plate portion, the end portion being located on the one end portion side of the tubular body in the axial direction, outward in a direction away from the tubular body, and the connecting plate portion being fixed integrally with the vehicle body-side attachment plate, and (d-3) a cut that is open toward the other end portion side of the tubular body in the axial direction is formed at the corner portion.

The second aspect of the invention provides the vehicular impact absorber recited in the first aspect of the invention, characterized in that: (a) the fixed plate portion has a first fixed plate portion fixed to a first side wall of the tubular body and a pair of a second fixed plate portion and a third fixed plate portion fixed respectively to a pair of a second side wall and a third side wall located on opposite sides of the first side wall across the ridge portions, and the cuts are formed respectively at a pair of the corner portions respectively located between the first fixed plate portion and the pair of the second and third fixed plate portions; and (b) the connecting plate portion has a first connecting plate portion bent outward from the first fixed plate portion and a pair of a second connecting plate portion and a third connecting plate portion respectively bent outward from the pair of the second fixed plate portion and the third fixed plate portion, and the first connecting plate portion and the pair of the second and third connecting plate portions are fixed integrally with each other via connection portions formed so as to be continuous from the corner portions.

The third aspect of the invention provides the vehicular impact absorber recited in the second aspect of the invention, characterized in that: (a) the tubular body has a rectangular section with right angles, the tubular body having an upper side wall that is disposed substantially horizontally at a position on an upper side in a vehicle-height direction when the tubular body is mounted in a vehicle, and a lower side wall that is disposed substantially horizontally at a position on a lower side in the vehicle-height direction when the tubular body is mounted in the vehicle, and the tubular body having a pair of lateral side walls extending in an up-down direction and located respectively on right and left sides of the upper side wall and the lower side wall; (b) the tubular body is fixed to the vehicle body-side attachment plate with use of a first bracket of which the fixed plate portion is fixed over the upper side wall of the tubular body and upper portions of the pair of the lateral side walls of the tubular body and a second bracket of which the fixed plate portion is fixed over the lower side wall of the tubular body and lower portions of the pair of the lateral side walls of the tubular body; and (c) each of the upper side wall and the lower side wall is the first side wall, and the pair of the lateral side walls is the pair of the second side wall and the third side wall.

Effects of the Invention

In the vehicular impact absorber as described above, the brackets to fix the tubular body to the vehicle body-side attachment plate are fixed to the plurality of side walls that are located adjacent to each other across the ridge portions of the tubular body, the brackets have the fixed plate portion that has the corner portions which are bent so as to conform to the ridge portions, and are fixed integrally with the vehicle body-side attachment plate via the connecting plate portion disposed at the end portion of the fixed plate portion. Thus, the rigidity of each of the brackets is increased due to the presence of the corner portions, and the one end portion of each tubular body is fixed to the vehicle body-side attachment plate with a high positioning strength. Thus, the posture of the tubular body is appropriately maintained until the latter half of the compressive deformation, and the impact energy absorption performance due to the crush of the tubular body is stably obtained until the end. Further, because the cuts that are open toward the other end portion are formed in the corner portions, the deformation of the tubular body is allowed within a range in which the cuts are formed. Thus, by appropriately setting the length of each of the cuts, it is possible to ensure a sufficient compression stroke while maintaining prescribed impact energy absorption performance.

In the second aspect of the invention, the fixed plate portion is formed to have the first fixed plate portion and the pair of the second fixed plate portion and the third fixed plate portion, and the connecting plate portion is formed to have the first connecting plate portion and the pair of the second connecting plate portion and the third connecting plate portion. Thus, the three side walls of the tubular body, which are continuous with each other, are fixed to the vehicle body-side attachment plate with the single bracket. Thus, it is possible to reduce the number of the brackets and the number of man-hours for fixing the tubular body to the vehicle body-side attachment plate, thereby reducing costs. In addition, the first connecting plate portion and the pair of the second connecting plate portion and the third connecting plate portion are integrally connected to each other via the connection portions that are formed so as to be continuous from the corner portions, respectively. Thus, a sufficient strength of each of the corner portions is ensured, and the one end portion of the tubular body is positioned and fixed further appropriately.

In the third aspect of the invention, the tubular body has a rectangular section with right angles i.e., a square section or a rectangular section, the tubular body has the upper side wall and the lower side wall, and the tubular body further has the pair of the lateral side walls extending in the up-down direction. The tubular body is fixed to the vehicle body-side attachment plate with the use of the first bracket having the fixed plate portion that is fixed over the upper side wall and the upper portions of the pair of the lateral side walls and the second bracket having the fixed plate portion that is fixed over the lower side wall and the lower portions of the pair of the lateral side walls. That is, the four side walls of the tubular body are fixed to the vehicle body-side attachment plate via at least one of the first bracket and the second bracket, and the pair of the lateral side walls among the four side walls are fixed by both the first bracket and the second bracket. Thus, the one end portion of the tubular body is fixed to the vehicle body-side attachment plate with a high positioning strength over the whole circumference, and the impact energy absorption performance due to the crush of the tubular body is stably obtained until the end.

MODES FOR CARRYING OUT THE INVENTION

The vehicular impact absorber according to the invention is disposed between the vehicle body-side member such as a side member and a bumper member, and an attachment plate to be fixed to the bumper member is disposed at the other end portion of the tubular body as needed. The bumper member is, for example, a bumper beam that functions as a reinforcement or attachment member of a bumper. The invention may be applied to a bumper member mounted on a vehicle front side and a bumper member mounted on a vehicle rear side, but may be applied to only one of the bumper member mounted on the vehicle front side and the bumper member mounted on the vehicle rear side. The vehicular impact absorber according to the invention is disposed, for example, in such a posture that the axial direction of the tubular body coincides with the vehicle longitudinal direction. However, the axial direction of the tubular body need not exactly coincide with the vehicle longitudinal direction, and the vehicular impact absorber according to the invention may be disposed in such a posture as to be tilted in the right-left direction or in the up-down direction depending on, for example, the shape of the bumper member.

The sectional shape of the hollow tubular body with a polygonal section may be a simple rectangular shape with right angles such as a square shape or a rectangular shape, or a tubular body with, for example, a pentagonal sectional shape, a hexagonal sectional shape, or an octagonal sectional shape may be adopted. In addition, the sectional shape may be a regular polygonal shape all the sides of which have the same length and all the angles of which are equal to each other, may be a polygonal shape having different lengths of sides or different angles, or may vary in the longitudinal direction as in the case of a tapered shape. A square pipe formed as a single-piece member may be used as the tubular body. However, various other forms may be adopted. For example, the tubular body may be a member that is formed by bending a single plate member into a rectangular tubular shape by a press and then integrally joining both side portions to each other by welding or the like, or a member that is formed by combining a plurality of plate members bent by a press into a rectangular tubular shape and then integrally joining the plate members to each other.

In addition, a stress concentration portion is formed in a distal end side portion of the tubular body as needed, such that, when an impact load is applied to the tubular body in the axial direction, the tubular body is crushed into a bellows shape from the distal end side (the other end portion side). The stress concentration portion is a portion that is deformed as a starting point of the crush of the tubular body into a bellows shape. The stress concentration portion is, for example, a bead that is recessed toward the inside of the tubular body or protrudes toward the outside of the tubular body, and extends perpendicularly to the longitudinal direction of the tubular body. When a through-hole such as a slit is formed, the periphery of the through-hole may be used as the stress concentration portion where stress is relatively concentrated that serves as the starting point of the deformation. A plurality of such stress concentration portions may be formed at prescribed intervals in the longitudinal direction.

The bracket has the fixed plate portion that has a prescribed length in the axial direction of the tubular body, and is fixed integrally with the side walls of the tubular body. The tubular body is reinforced by the fixed plate portion, and thus impact energy absorption characteristics in the latter half of compressive deformation are adjusted by changing the length (referred also to as height) of the fixed plate portion. The fixed plate portion has the corner portions that are bent so as to conform to the ridge portions of the tubular body. Due to the presence of the corner portions, the one end portion of the tubular body is firmly positioned and fixed to the vehicle body-side attachment plate. Further, the cuts that are open toward the other end portion of the tubular body are formed at the corner portions, and the cuts allow the tubular body to be appropriately compressed and deformed. The length of each cut is set as needed to ensure prescribed impact energy absorption performance and compression stroke. The one end portion of the tubular body is appropriately positioned with respect to and fixed to the vehicle body-side attachment plate when each corner portion has a length of for example, approximately 5 mm to 15 mm from the connecting plate portion, although the length of the corner portion varies depending on material of the bracket. Thus, each cut may be formed so as to be as long as possible within such a range that appropriate positioning and fixing are possible, and thus the compressive stroke is increased accordingly.

It is desirable that the height of the fixed plate portion (distance in the axial direction from the vehicle body-side attachment plate toward the other end portion side of the tubular body) be greater than an amount of a portion of the tubular body that is not crushed when an impact load is applied. For example, when the tubular body is a steel plate, it is desirable that the height of the fixed plate portion be equal to or larger than 20% of the length of the tubular body, and when the tubular body is an aluminum alloy, it is desirable that the height of the fixed plate portion be equal to or larger than 30% of the length of the tubular body, although the height of the fixed plate portion varies depending on, for example, the sectional shape and the plate thickness of the tubular body.

In the second aspect of the invention, the fixed plate portion has the first fixed plate portion and the pair of the second fixed plate portion and the third fixed plate portion, and the fixed plate portion is fixed to the three side walls of the tubular body. However, in the first aspect of the invention, the fixed plate portion may have only a pair of the first fixed plate portion and the second fixed plate portion that are fixed to a pair of the side walls which are located so as to be adjacent to each other across the ridge portion and one corner portion located between the first fixed plate portion and the second fixed plate portion. In addition, the fixed plate portion may have a polygonal tubular shape having the same polygonal section as that of the tubular body and fitted to the outer side of the tubular body, the connecting plate portion may be disposed at the one end portion of the fixed plate portion, and the cuts may be formed at the corner portions.

In the second aspect of the invention, the first connecting plate portion and the pair of the second connecting plate portion and the third connecting plate portion are connected integrally with each other via the connection portions that are formed so as to be continuous from the corner portions. However, in the first aspect of the invention, the first connecting plate portion, the second connecting plate portion, and the third connecting plate portion may be formed separately from each other. In addition, in the second aspect of the invention, the first connecting plate portion and the pair of the second connecting plate portion and the third connecting plate portion are formed so as to respectively correspond to the first fixed plate portion and the pair of the second fixed plate portion and the third fixed plate portion. However, in the first aspect of the invention, only the pair of the second connecting plate portion and the third connecting plate portion may be formed so as to correspond to some of the first fixed plate portion, the second fixed plate portion, and the third fixed plate portion, for example, the pair of the second fixed plate portion and the third fixed plate portion, so that the first connecting plate portion may be omitted.

EMBODIMENTS

Hereinafter, embodiments of the invention will be described in detail with reference to drawings.

Figure 1:
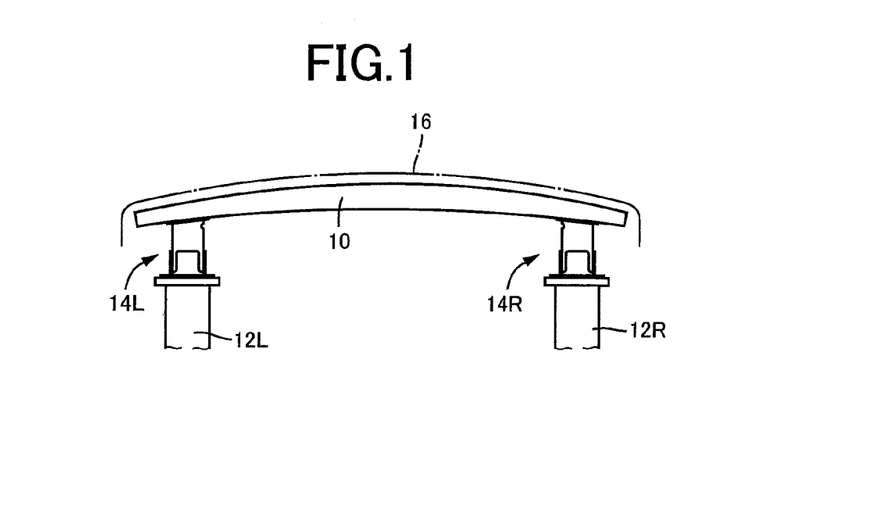
FIG. 1 is a schematic plan view illustrating a vehicular impact absorber that is an embodiment of the invention, the view being an example in which the vehicular impact absorber is arranged in a vehicle.
Figure 2:
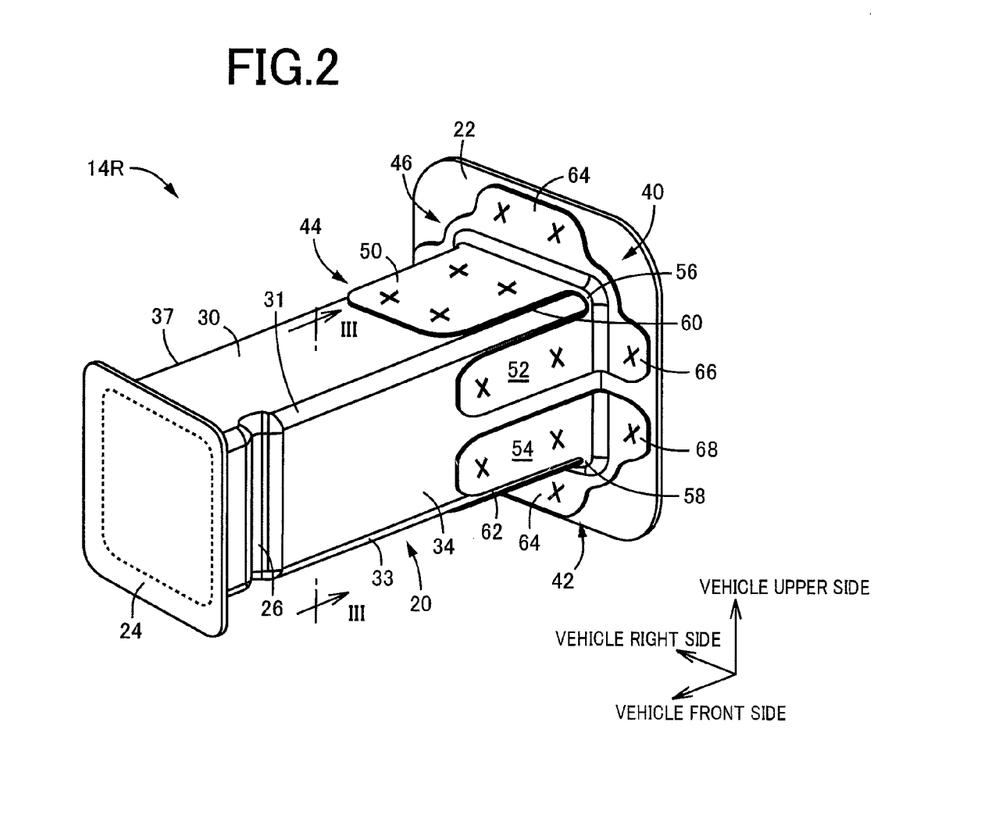
FIG. 2 is a perspective view illustrating the vehicular impact absorber solely used in FIG. 1.

FIG. 1 is a schematic plan view of the configuration near a bumper beam 10 disposed on the front side of a vehicle, as viewed from above the vehicle. Crush boxes 14R, 14L, each serving as a vehicular impact absorber, are respectively disposed at front end portions of right and left side members 12R, 12L, and the bumper beam 10 is fixed to the crush boxes 14R, 14L at right and left end portions thereof. FIG. 2 is an enlarged perspective view illustrating the right crush box 14R. The crush box 14R has a hollow tubular body 20 having a plurality of flat plate-shaped side walls and having a polygonal section, and a pair of attachment plates 22, 24 fixed integrally with respective axial end portions of the tubular body 20 by welding or the like. The crush box 14R is fixed at the attachment plates 22, 24 to the side member 12R and the bumper beam 10 with fixing means such as bolts (not illustrated) or welding in such a posture that the axial direction of the tubular body 20 is substantially parallel to the vehicle longitudinal direction.

When an impact is applied to the crush box 14R from the vehicle front side and the crush box 14R receives a compressive load in its axial direction, the tubular body 20 is crushed into a bellows shape and impact energy is absorbed through the deformation of the tubular body 20, so that an impact to be applied to structural members of the vehicle, such as the side member 12R, is buffered. The crush of the tubular body 20 into a bellows shape is a phenomenon that is caused as the tubular body 20 is successively buckled (bent) at its multiple portions. Usually, the buckling of the tubular body 20 is started from the bumper beam 10 side, that is, the impact input side, and proceeds toward a vehicle body side over time. In the present embodiment, a bead 26 deformed into a groove shape is formed at a distal end portion of the tubular body 20. When the bead 26 is buckled due to stress concentration, the bead 26 serves as a starting point of the crush of the tubular body 20 into a bellows shape and compressive deformation proceeds. The bead 26 is formed in one of the side walls of the tubular body 20, that is, a lateral side wall 34 located on a vehicle inboard side so as to extend perpendicularly to the axial direction (extend in the up-down direction).

The bumper beam 10 functions as a reinforcement (reinforcing member) and attachment member of a bumper, and a bumper fascia 16 made of a synthetic resin or the like is fixedly fitted to the bumper beam 10. The bumper beam 10 corresponds to a bumper member, the side members 12R, 12L each correspond to a vehicle body-side member, and the attachment plate 22 corresponds to a vehicle body-side attachment plate. Note that, because the left crush box 14L is configured so as to be symmetrical to the right crush box 14R and produces the same effect as that of the right crush box 14R, the right crush box 14R will be described in detail in the following explanation.

Figure 3:
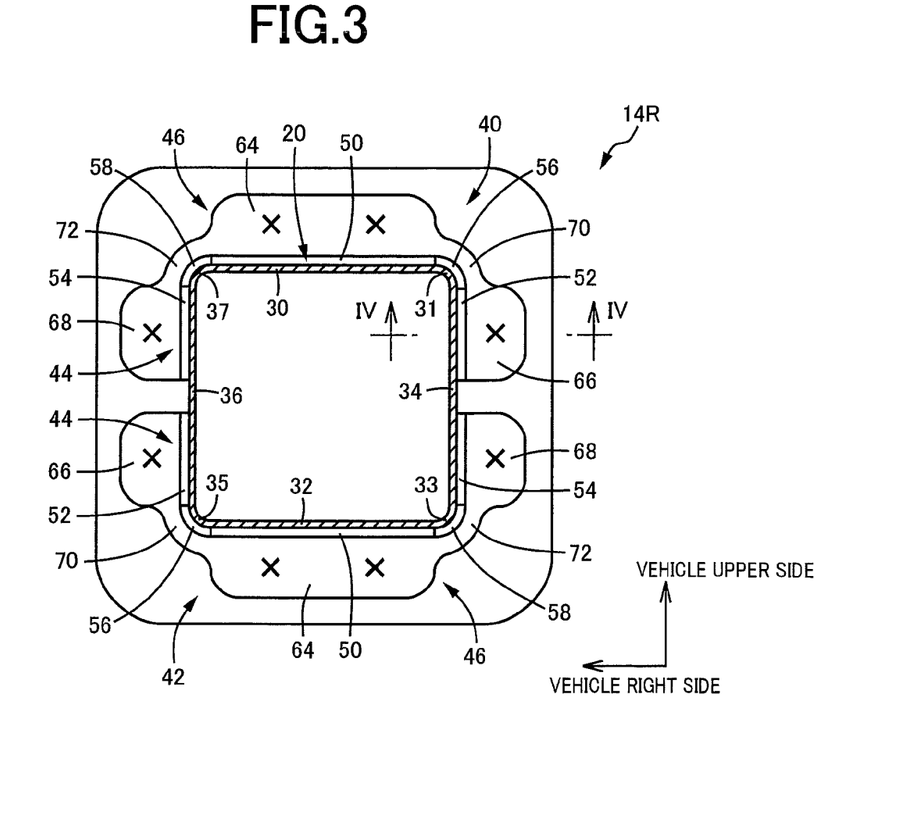
FIG. 3 is an enlarged sectional view taken along the line III-III indicated by arrows in FIG. 2.
Figure 4:
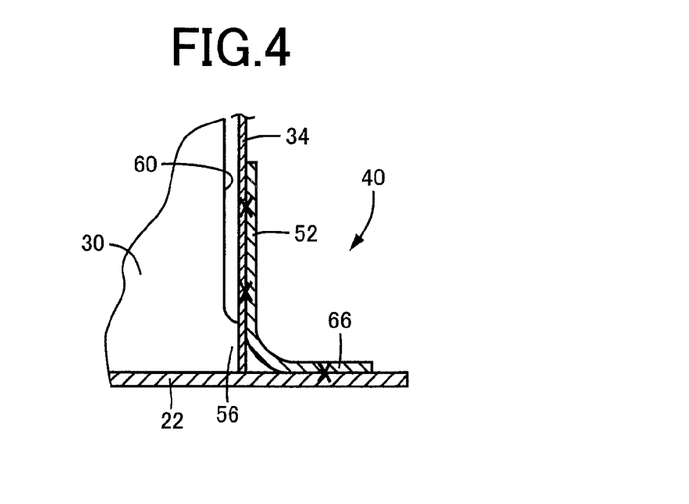
FIG. 4 is an enlarged sectional view taken along the line IV-IV indicated by arrows in FIG. 3.

FIG. 3 is an enlarged sectional view taken along the line III-III indicated by arrows in FIG. 2, that is, a view illustrating a section that is perpendicular to the axial direction of the tubular body 20. FIG. 4 is an enlarged sectional view taken along the line IV-IV indicated by arrows in FIG. 3. As is apparent from these drawings, the tubular body 20 has a hollow rectangular tubular shape with a square section, and has an upper side wall 30 that is disposed substantially horizontally at a position on the upper side in the vehicle-height direction when the tubular body 20 is mounted in the vehicle, and a lower side wall 32 that is disposed substantially horizontally at a position on the lower side in the vehicle-height direction when the tubular body 20 is mounted in the vehicle. The tubular body 20 further has a pair of lateral side walls 36, 34 extending in the up-down direction, and respectively located on the right and left sides of the upper side wall 30 and the lower side wall 32. The side walls 30, 34, 32, 36 are connected to each other via ridge portions 31, 33, 35, 37 each of which is curved into a circular arc shape (specifically, ¼ cylinder shape). In the present embodiment, a seamless square pipe that is rounded at the ridge portions 31, 33, 35, 37 is used as the tubular body 20. One end portion of the tubular body 20 is fixed integrally with the attachment plate 22 via a pair of first and second brackets 40, 42 in a state where the one end portion is brought into contact with the attachment plate 22 so as to abut against the attachment plate 22 substantially perpendicularly to the attachment plate 22. The other end portion of the tubular body 20 is fixed integrally with the attachment plate 24 by fillet welding or the like in a state where the other end portion is brought into contact with the attachment plate 24 so as to abut against the attachment plate 24.

Figure 5:
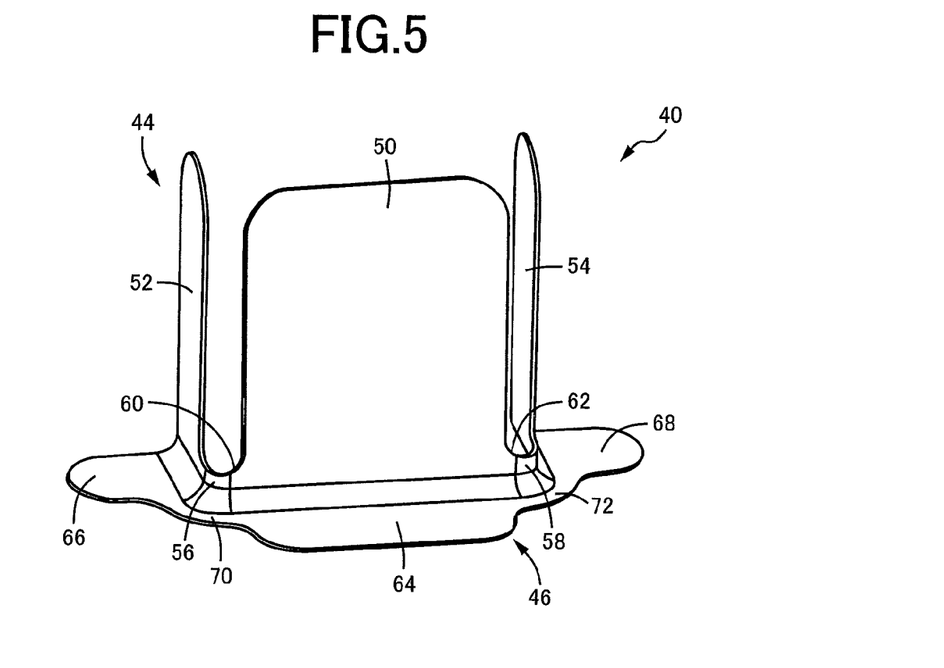
FIG. 5 is a perspective view illustrating one of a pair of brackets solely indicated in FIG. 2.
Figure 6:
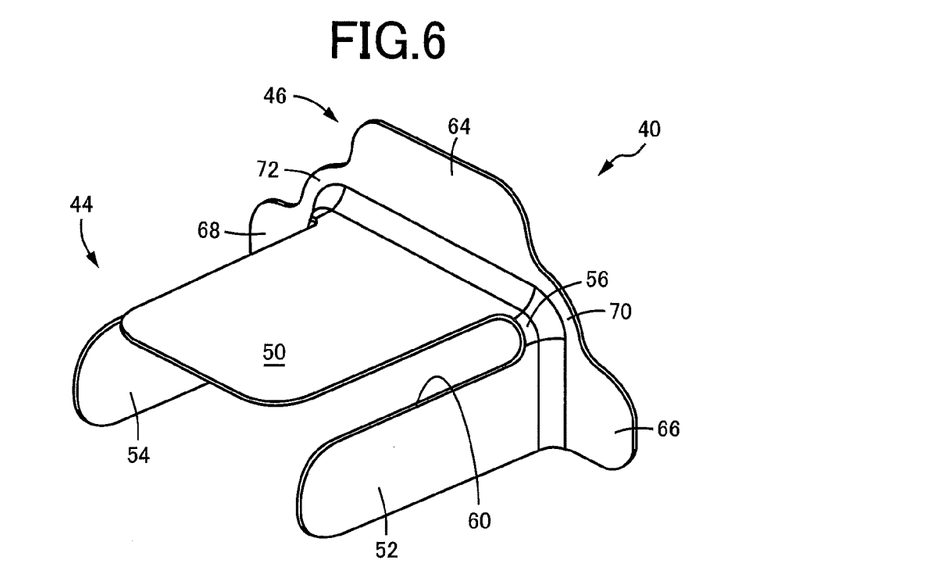
FIG. 6 is a perspective view of the bracket of FIG. 5 as viewed from different directions.

The first bracket 40 and the second bracket 42 have the same shape. In the following explanation, the first bracket 40 will be described in detail, and the same reference symbols as those of the first bracket 40 will be assigned to the second bracket 42 and detailed description on the second bracket 42 will be omitted. FIG. 5 and FIG. 6 are perspective views of the first bracket 40 as viewed from different directions. The first bracket 40 has a fixed plate portion 44 that is fixed integrally with the tubular body 20 by welding means such as spot welding or arc welding, and a connecting plate portion 46 that is fixed integrally with the attachment plate 22 by welding means such as spot welding or arc welding. The fixed plate portion 44 has a first fixed plate portion 50 that has a prescribed length (for example, equal to or smaller than ½ of the length of the tubular body 20) in the axial direction of the tubular body 20, and a pair of second and third fixed plate portions 52, 54 that are respectively located on the opposite sides of the first fixed plate portion 50. The first fixed plate portion 50, the second fixed plate portion 52, and the third fixed plate portion 54 are integrally connected to each other via corner portions 56, 58 that are each bent by 90° into an arc-shape so as to conform to the ridge portions 31, 37.

The first fixed plate portion 50 is disposed so as to be in close contact with and fixed integrally with an outer face of the upper side wall 30, and the second fixed plate portion 52 and the third fixed plate portion 54 are disposed so as to be in close contact with and fixed integrally with outer faces of the lateral side walls 34, 36, respectively. The width of each of the second fixed plate portion 52 and the third fixed plate portion 54 is approximately half the width of the first fixed plate portion 50, and the second fixed plate portion 52 and the third fixed plate portion 54 are respectively fixed to upper portions of the lateral side walls 34, 36. The upper side wall 30 corresponds to a first side wall, and the lateral side walls 34, 36 respectively correspond to a second side wall and a third side wall. In addition, the corner portions 56, 58 respectively have cuts 60, 62, that are in the form of slits, and that are open toward the other end portion-side of the tubular body 20 in the axial direction, that is, the side opposite to the connecting plate portion 46. Due to the presence of the corner portions 56, 58, the rigidity of the first bracket 40 increases, the one end portion of the tubular body 20 is appropriately positioned, and thus impact energy absorption performance is appropriately maintained until the latter half of the compressive deformation. However, if the corner portions 56, 58 are formed up to distal end of the fixed plate portion 44, the deformation of the tubular body 20 is inhibited and a compression stroke is shortened. Therefore, the cuts 60, 62 are formed, so that the tubular body 20 is appropriately deformed and a sufficient compression stroke is ensured.

The length of each of the cuts 60, 62 is appropriately determined such that prescribed impact energy absorption performance is maintained until the latter half of the compressive deformation and a sufficient compression stroke is ensured. For example, the length of each of the cuts 60, 62 is set such that each of the corner portions 56, 58 has a straight part with a length of equal to or larger than 2 mm, that is, the length of each of the cuts 60, 62 is equal to or larger than the length of a rounded end height (the height of a bent rounded portion that is located between the fixed plate portion 44 and the connecting plate portion 46 and that include each of the corner portions 56, 58, the rounded end height being a distance in the axial direction from the attachment plate 22 toward the other end portion side of the tubular body 20)+2 mm. The width of each of the cuts 60, 62 is not particularly limited, but it is desirable that the width of each of the cuts 60, 62 be equal to or larger than approximately 10 mm in a development view state in consideration of trimming using a press. It is desirable that the height of the fixed plate portion 44 (the distance in the axial direction from the attachment plate 22 toward the other end portion of the tubular body 20) be equal to or larger than the rounded end height+13 mm in the case where the fixed plate portion 44 is fixed to the tubular body 20 by, for example, spot welding, and be equal to or larger than the rounded end height+7 mm in the case where the fixed plate portion 44 is fixed to the tubular body 20 by arc welding. In addition, it is desirable that the plate thickness of each of the brackets 40, 42 be at least 1.2 times larger than the plate thickness of the tubular body 20 in order to reliably position a root portion of the tubular body 20. In the present embodiment, the plate thickness of the tubular body 20 is 1.2 mm, and the plate thickness of each of the brackets 40, 42 is 2.0 mm. When each of the brackets 40, 42 has a larger plate thickness, the axial compressive load on the root portion becomes higher and the weight of each of the brackets 40, 42 becomes heavier. Thus, it is desirable that the plate thickness of each of the brackets 40, 42 be approximately twice as large as the plate thickness of the tubular body 20 or less. Each of the tubular body 20 and the brackets 40, 42 in the present embodiment is made of a steel plate having a tensile strength of 440 MPa. Note that, each reference symbol "x" in FIG. 2 to FIG. 4 indicates a welding area in the case of spot welding.

The connecting plate portion 46 is a portion that is bent at substantially right angle from an end portion of the fixed plate portion 44, which is positioned on the one end portion side in the axial direction of the tubular body 20, outward in a direction away from the tubular body 20, and is fixed integrally with the attachment plate 22 by welding means such as spot welding or arc welding. Specifically, the connecting plate portion 46 has a first connecting plate portion 64 that is bent outward from the first fixed plate portion 50, and a pair of the second connecting plate portion 66 and the third connecting plate portion 68 that are respectively bent outward from the paired second fixed plate portion 52 and third fixed plate portion 54, and the first connecting plate portion 64, the second connecting plate portion 66, and the third connecting plate portion 68 are each fixed integrally with the attachment plate 22 by welding means such as spot welding or arc welding. The width of each of the second connecting plate portion 66 and the third connecting plate portion 68 is approximately half the width dimension of the first connecting plate portion 64. In addition, the first connecting plate portion 64 and the pair of the second connecting plate portion 66 and the third connecting plate portion 68 are integrally connected to each other via sector-shaped connection portions 70, 72 that are formed so as to be continuous from the corner portions 56, 58, respectively.

The second bracket 42 is used to fixedly fit the lower side wall 32 and the lateral side walls 34, 36 to the attachment plate 22. The first fixed plate portion 50 is disposed so as to be in close contact with an outer face of the lower side wall 32 and fixed integrally with the outer face by welding means such as spot welding, and the second fixed plate portion 52 and the third fixed plate portion 54 are disposed so as to be in close contact with outer faces of lower portions of the lateral side walls 36, 34, respectively, and fixed integrally with the outer faces by welding means such as spot welding. The second bracket 42 is the same as the first bracket 40 in that the first connecting plate portion 64, the second connecting plate portion 66, and the third connecting plate portion 68 are each fixed integrally with the attachment plate 22 by welding means such as spot welding.

As described above, in each of the vehicular impact absorbers 14R, 14L according to the present embodiment, the first bracket 40 and the second bracket 42 are used to fix the tubular body 20 to the attachment plate 22, the first bracket 40 is fixed to the plurality of side walls 30, 34, 36 that are located adjacent to each other across the ridge portions 31, 37 of the tubular body 20, the first bracket 40 has the fixed plate portion 44 that has the corner portions 56, 58 which are bent so as to conform to the ridge portions 31, 37, and the connecting plate portion 46 disposed at the end portion of the fixed plate portion 44 is fixed integrally with the attachment plate 22. Similarly, the second bracket 42 is fixed to the plurality of side walls 32, 34, 36 that are located adjacent to each other across the ridge portions 33, 35 of the tubular body 20, the second bracket 42 has the fixed plate portion 44 that has the corner portions 56, 58 which are bent so as to conform to the ridge portions 33, 35, and the connecting plate portion 46 that is disposed at the end portion of the fixed plate portion 44 is fixed integrally with the attachment plate 22. In this case, the rigidity of each of the brackets 40, 42 is increased due to the presence of the corner portions 56, 58, and the one end portion of each tubular body 20 having a plate thickness of 1.2 mm is fixed with a high positioning strength in a state where the one end portion of the tubular body 20 abuts against the attachment plate 22.

Thus, the posture of the tubular body 20 is appropriately maintained until the latter half of the compressive deformation, and the impact energy absorption performance due to the crush of the tubular body 20 is stably obtained until the end. Further, because the cuts 60, 62 that are open toward the other end portion are formed in the corner portions 56, 58, the deformation of the tubular body 20 is allowed within a range in which the cuts 60, 62 are formed. Thus, by appropriately setting the length of each of the cuts 60, 62, it is possible to ensure a sufficient compression stroke while maintaining prescribed impact energy absorption performance.

Further, the fixed plate portion 44 is formed to have the first fixed plate portion 50 and the pair of the second fixed plate portion 52 and the third fixed plate portion 54, and the connecting plate portion 46 is formed to have the first connecting plate portion 64 and the pair of the second connecting plate portion 66 and the third connecting plate portion 68. Thus, the three side walls 30, 34, 36 of the tubular body 20, which are continuous with each other, are fixed to the attachment plate 22 with the single first bracket 40, and the three side walls 32, 34, 36 of the tubular body 20, which are continuous with each other, are fixed to the attachment plate 22 with the single second bracket 42. Thus, it is possible to reduce the number of the brackets 40, 42 and the number of man-hours for fixing the tubular body 20 to the attachment plate 22, thereby reducing costs.

In addition, the first connecting plate portion 64 and the pair of the second connecting plate portion 66 and the third connecting plate portion 68 are integrally connected to each other via the sector-shaped connection portions 70, 72 that are formed so as to be continuous from the corner portions 56, 58, respectively. Thus, a sufficient strength of each of the corner portions 56, 58 is ensured, and the one end portion of the tubular body 20 is positioned and fixed further appropriately.

Further, in the present embodiment, the tubular body 20 has a square section, the tubular body 20 has the upper side wall 30 and the lower side wall 32, and the tubular body 20 further has the pair of the lateral side walls 34, 36 extending in the up-down direction. The tubular body 20 is fixed to the attachment plate 22 with the use of the first bracket 40 having the fixed plate portion 44 that is fixed over the upper side wall 30 and the upper portions of the pair of the lateral side walls 34, 36 and the second bracket 42 having the fixed plate portion 44 that is fixed over the lower side wall 32 and the lower portions of the pair of the lateral side walls 34, 36. That is, the four side walls 30, 32, 34, 36 of the tubular body 20 are fixed to the attachment plate 22 via at least one of the first bracket 40 and the second bracket 42, and the pair of the lateral side walls 34, 36 among the four side walls 30, 32, 34, 36 are fixed by both the first bracket 40 and the second bracket 42. Thus, the one end portion of the tubular body 20 is fixed to the attachment plate 22 with a high positioning strength over the whole circumference, and the impact energy absorption performance due to the crush of the tubular body 20 is stably obtained until the end.

Figure 7:
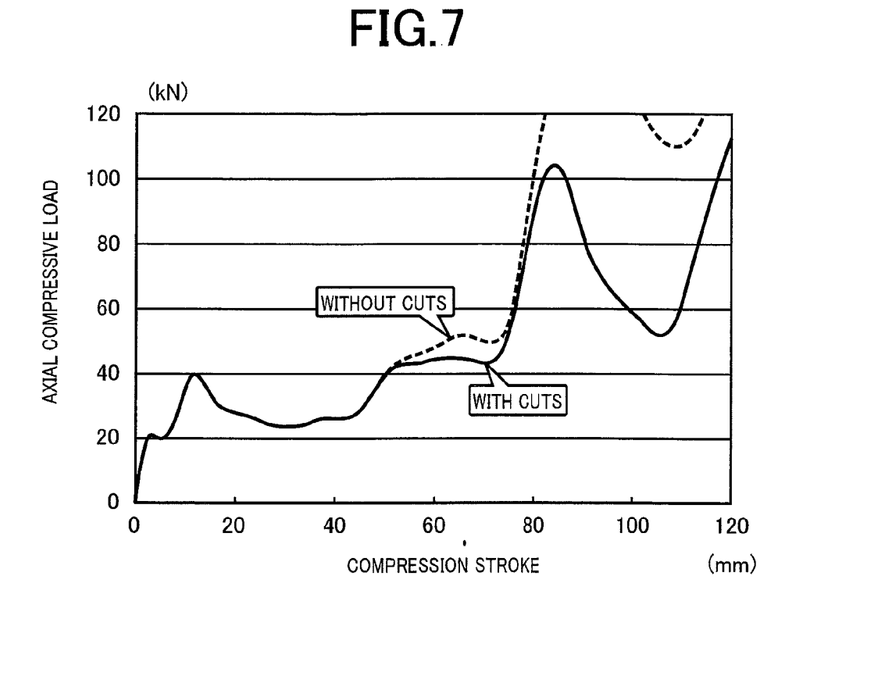
FIG. 7 is a view of the result obtained when the variation characteristic of a compressive load in an axial direction with respect to the compression stroke was checked between the product according to the invention "WITH CUTS" and the comparative product "WITHOUT CUTS".
Figure 8:
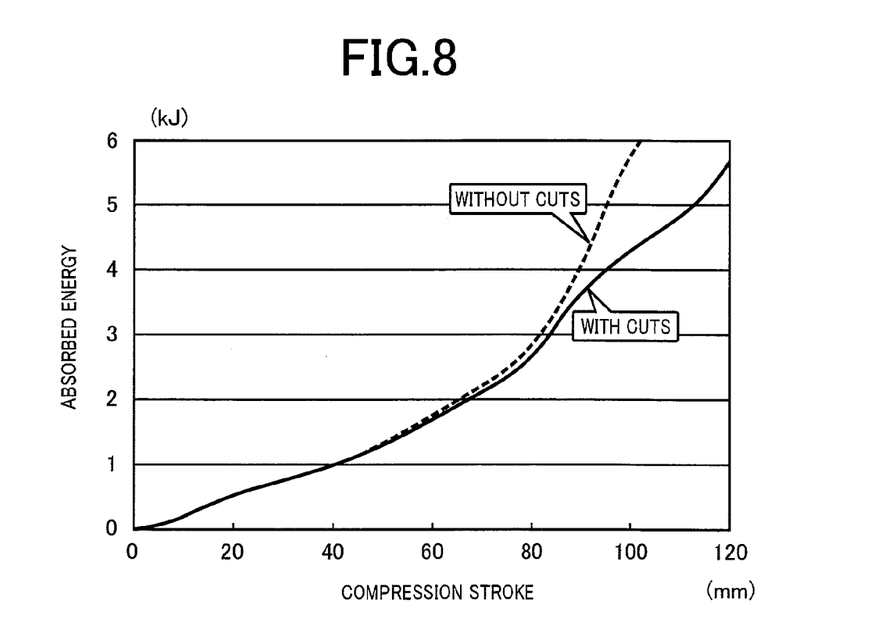
FIG. 8 is a view of the result obtained when the variation characteristic of the absorbed energy with respect to the compression stroke is checked between the product according to the invention and the comparative product, based on the result indicated in FIG. 7.

The crush box 14R according to the embodiment, which is the product according to the invention, and a comparative product in which the tubular body 20 is fixed to the attachment plate 22 with the use of a bracket in which the cuts 60, 62 are not formed at the corner portions 56, 58 were prepared, and a rigid body wall having a flat face perpendicular to the axial direction was made to collide with each of the crush box 14R and the comparative product at 16 km/h. Then, variation characteristics of the axial compressive load and the absorbed energy with respect to the compression stroke were checked, and then the results indicated in FIG. 7 and FIG. 8 are obtained. The tubular body 20 is a steel pipe having a length of 150 mm and a plate thickness of 1.2 mm, the plate thickness of each of the brackets 40, 42 is 2.0 mm, the height of the fixed plate portion 44 is 55 mm, and the height of each of the remaining corner portions 56, 58 in the product according to the invention, where the cuts 60, 62 are formed, is 6.0 mm (including the rounded portion). The brackets 40, 42 are fixed to the tubular body 20 and the attachment plate 22 by spot welding in both the product according to the invention and the comparative product.

"WITH CUTS" (solid lines) in FIG. 7 and FIG. 8 indicate the product according to the invention (crush box 14R), and "WITHOUT CUTS" (dashed lines) indicate the comparative product. In the comparative product (without cuts), the axial compressive load starts increasing when the compression stroke becomes approximately 53 mm, and there is a possibility that a large impact load will act on, for example, the side member 12R before desired impact energy absorption performance is obtained and, for example, the side member 12R may be damaged. In contrast to this, in the product according to the invention (with cuts), an increase in the axial compressive load is suppressed until the compression stroke reaches approximately 73 mm and appropriate impact energy absorption performance is obtained, so that damage to, for example, the side member 12R is suppressed. The absorbed energy in FIG. 8 corresponds to an integral value of the axial compressive load in FIG. 7.

Next, other embodiments of the invention will be described. Note that, in the following embodiments, substantially the same elements as those in the above-described embodiment will be denoted by the same reference symbols as those in the above-described embodiment, and detailed description thereof will be omitted.

Figure 9:
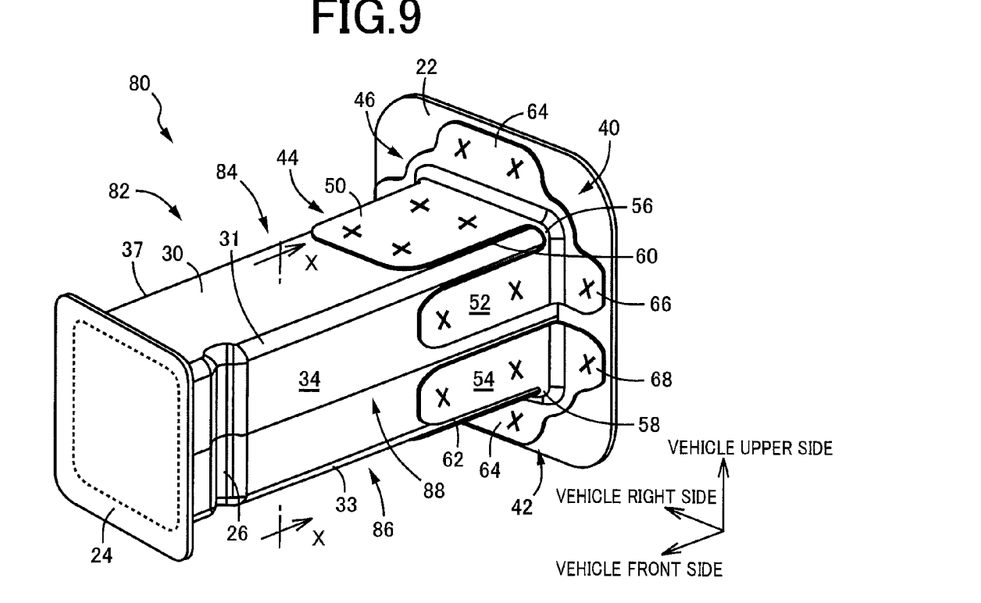
FIG. 9 is a perspective view illustrating another embodiment of the invention, the view corresponding to FIG. 2.
Figure 10:
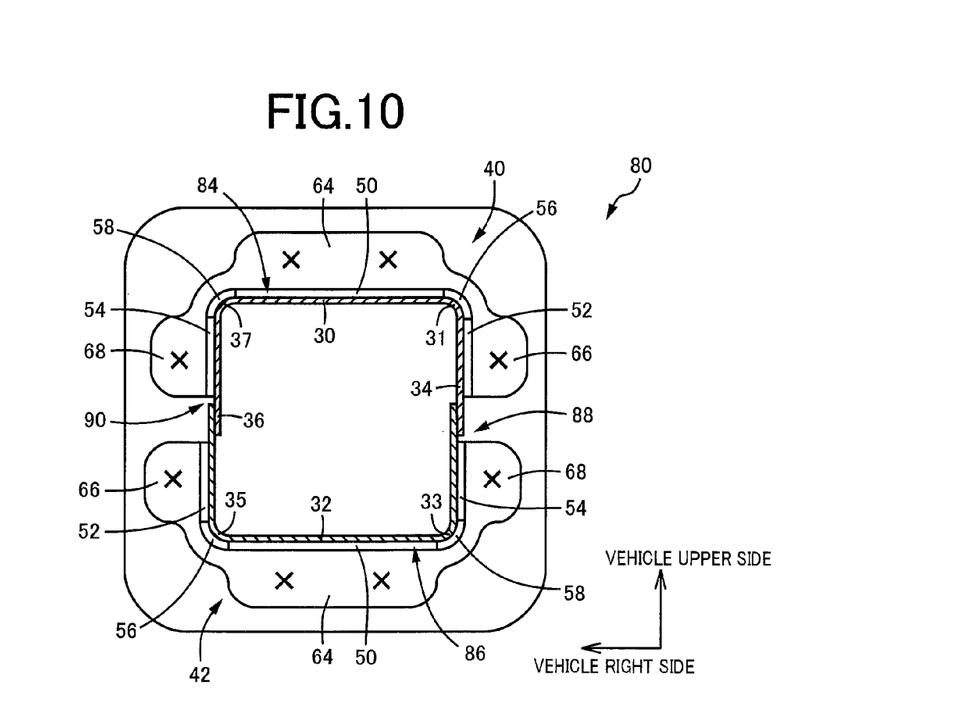
FIG. 10 is an enlarged sectional view taken along the line X-X indicated by arrows in FIG. 9.

FIG. 9 and FIG. 10 are views that respectively correspond to FIG. 2 and FIG. 3, and FIG. 10 is an enlarged sectional view taken along the line X-X indicated by arrows in FIG. 9. A crush box 80 differs from the crush box 14R in that a tubular body 82 is formed of a pair of halves 84, 86. Each of the halves 84, 86 is a member that has a section having a U-shape with angled corners, and that has a shape obtained by splitting the tubular body 82 into two pieces substantially evenly in the up-down direction. The halves 84, 86 are joined integrally with each other by arc welding or the like in a state where opening-side portions of the halves 84, 86 are overlapped with each other so as to face each other, so that the hollow tubular body 82 having a square section, which is substantially the same as that of the tubular body 20, is obtained. In this case, steps 88, 90 are formed at middle portions of the pair of the lateral side walls 34, 36. However, because the pair of the second fixed plate portion 52 and the third fixed plate portion 54 of the first bracket 42 are fixed to the upper portions of the lateral side walls 34, 36 and the pair of the second fixed plate portion 52 and the third fixed plate portion 54 of the second bracket 40 are fixed to the lower portions of the lateral side walls 36, 34, the first bracket 40 and the second bracket 42 are appropriately welded and fixed to the lateral side walls 34, 36 despite the presence of the steps 88, 90. Thus, the tubular body 82 is appropriately fixed to the attachment plate 22 with the use of the pair of the first bracket 40 and the second bracket 42, as in the above-described embodiment.

Figure 11:
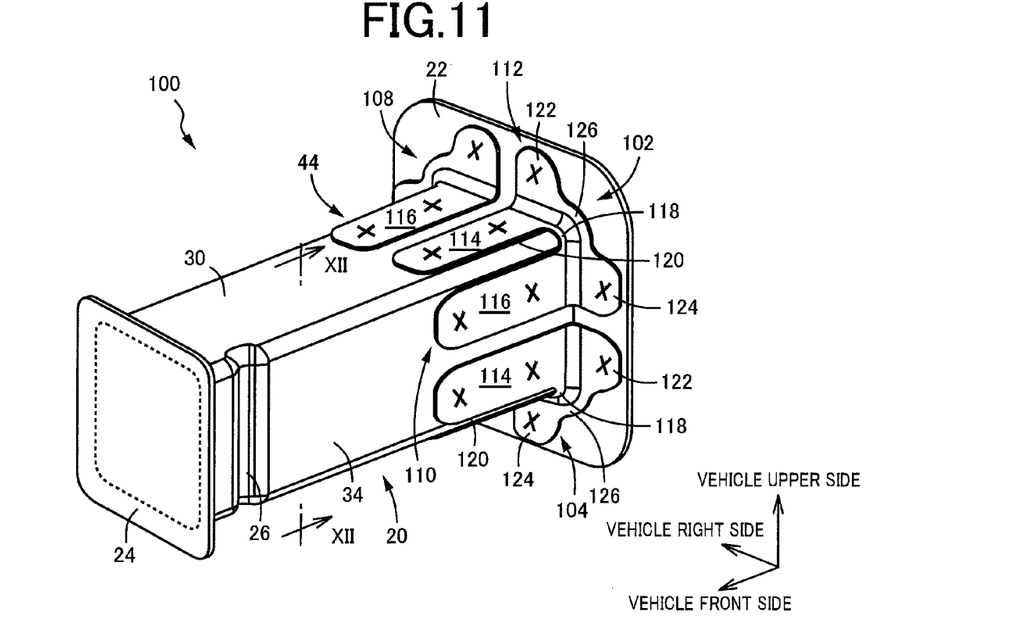
FIG. 11 is a perspective view illustrating a further embodiment of the invention, the view corresponding to FIG. 2.
Figure 12:
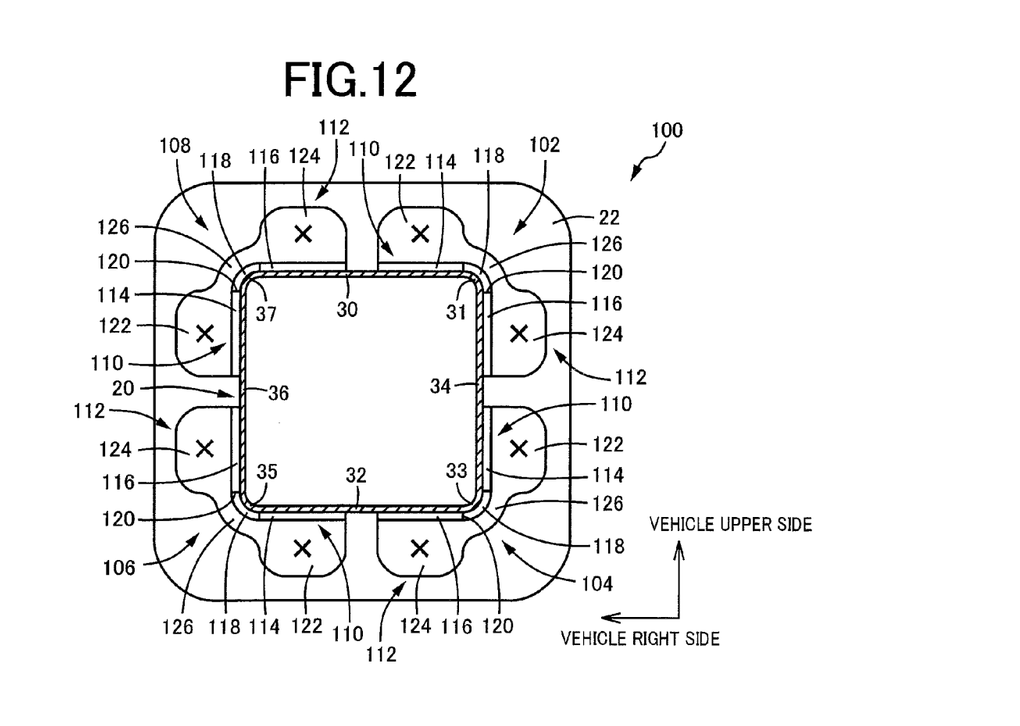
FIG. 12 is an enlarged sectional view taken along the line XII-XII indicated by arrows in FIG. 11.

FIG. 11 and FIG. 12 are views that respectively correspond to FIG. 2 and FIG. 3, and FIG. 12 is an enlarged sectional view taken along the line XII-XII indicated by arrows in FIG. 11. A crush box 100 differs from the crush box 14R in that the tubular body 20 is fixed to the attachment plate 22 with the use of four brackets 102, 104, 106, 108. The four brackets 102, 104, 106, 108 have the same shape, and each of the four brackets 102, 104, 106, 108 has a fixed plate portion 110 that is fixed integrally with the tubular body 20 by welding means such as spot welding, and a connecting plate portion 112 that is fixed integrally with the attachment plate 22 by welding means such as spot welding. The fixed plate portion 110 has a pair of a first fixed plate portion 114 and a second fixed plate portion 116 that have a prescribed length in the axial direction of the tubular body 20, and corner portions 118, which are bent by 90° into an arc shape so as to conform to the ridge portions 31, 33, 35, 37, are formed between the first fixed plate portions 114 and the second fixed plate portions 116. A cut 120 that is open toward the other end portion like the cuts 60, 62 is formed at each corner portion 118.

The width of each of the first fixed plate portion 114 and the second fixed plate portion 116 is equal to or smaller than half the width of each of the side walls 30, 32, 34, 36, and the four brackets 102, 104, 106, 108 are respectively disposed at four corner portions of the tubular body 20. The first fixed plate portion 114 and the second fixed plate portion 116 are fixed, without interfering with each other, integrally with a pair of side walls among the side walls 30, 32, 34, 36 which are located adjacent to each other on the opposite sides across the ridge portions 31, 33, 35, 37. Specifically, the first fixed plate portion 114 and the second fixed plate portion 116 of the bracket 102 are respectively fixed to the upper side wall 30 and the lateral side wall 34 that are located on the opposite sides of the ridge portion 31. The first fixed plate portion 114 and the second fixed plate portion 116 of the bracket 104 are respectively fixed to the lateral side wall 34 and the lower side wall 32 that are located on the opposite sides of the ridge portion 33. The first fixed plate portion 114 and the second fixed plate portion 116 of the bracket 106 are respectively fixed to the lower side wall 32 and the lateral side wall 36 that are located on the opposite sides of the ridge portion 35. The first fixed plate portion 114 and the second fixed plate portion 116 of the bracket 108 are respectively fixed to the lateral side wall 36 and the upper side wall 30 that are located on the opposite sides of the ridge portion 37.

The connecting plate portion 112 is a portion that is bent outward at substantially right angle from one end portion of the fixed plate portion 110 and is fixed integrally with the attachment plate 22 by welding means such as spot welding. The connecting plate portion 112 has a first connecting plate portion 122 that is bent outward from the first fixed plate portion 114, and a second connecting plate portion 124 that is bent outward from the second fixed plate portion 116. The first connecting plate portion 122 and the second connecting plate portion 124 are each fixed integrally with the attachment plate 22 by welding means such as spot welding. In addition, the first connecting plate portion 122 and the second connecting plate portion 124 are integrally connected to each other via a sector-shaped connection portion 126 that is formed so as to be continuous from the corner portion 118.

In the present embodiment, the one end portion of the tubular body 20 is fixedly fitted to the attachment plate 22 with the use of the four brackets 102, 104, 106, 108, and the number of brackets is larger than that in the above-described embodiment. However, the present embodiment is the same as the above-described embodiment in that the one end portion of the tubular body 20 is fixed to the attachment plate 22 with a high positioning strength in a state where the one end portion of the tubular body 20 abuts against the attachment plate 22. Thus, the posture of the tubular body 20 is appropriately maintained until the latter half of the compressive deformation, the impact energy absorption performance due to the crush of the tubular body 20 is stably obtained until the end, and the tubular body 20 is appropriately deformed due to the presence of the cuts 120. Thus, it is possible to obtain the same advantageous effects as those in the above-described embodiment, for example, it is possible to ensure a sufficient compression stroke while maintaining prescribed impact energy absorption performance.

Figure 13:
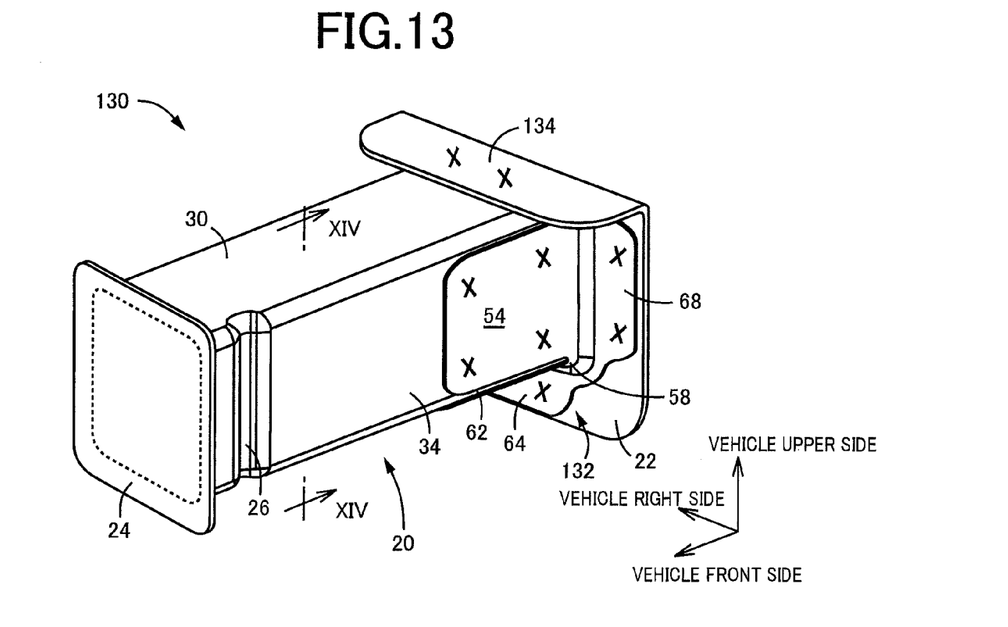
FIG. 13 is a perspective view illustrating a still further embodiment of the invention, the view corresponding to FIG. 2.
Figure 14:
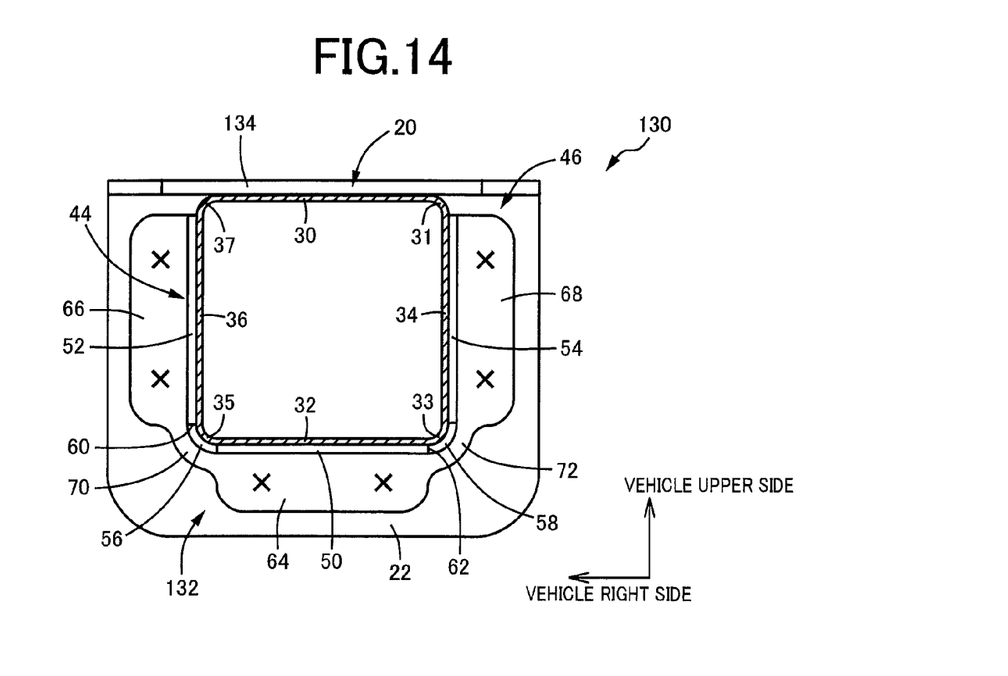
FIG. 14 is an enlarged sectional view taken along the line XIV-XIV indicated by arrows in FIG. 13.

FIG. 13 and FIG. 14 are views that respectively correspond to FIG. 2 and FIG. 3, and FIG. 14 is an enlarged sectional view taken along the line XIV-XIV indicated by arrows in FIG. 13. A crush box 130 differs from the crush box 14R in that the tubular body 20 is fixed to the attachment plate 22 via a single bracket 132, an upper end portion of the attachment plate 22 is bent at substantially right angle toward the tubular body 20 side, and a bent portion 134 is fixed integrally with the upper side wall 30 of the tubular body 20 by welding means such as spot welding. Like the second bracket 42, the bracket 132 has a first fixed plate portion 50, a second fixed plate portion 52, and a third fixed plate portion 54, which are respectively fixedly welded to the lower side wall 32 and the lateral side walls 36, 34 of the tubular body 20. However, the second fixed plate portion 52 and the third fixed plate portion 54 each have a width that is substantially equal to that of the first fixed plate portion 50 and that is larger than the width of each of the second and third fixed plate portions 52, 54 in the above-described embodiment, and the second fixed plate portion 52 and the third fixed plate portion 54 in the present embodiment are fixed to the lateral side walls 36, 34 over their entire widths. The second connecting plate portion 66 and the third connecting plate portion 68 also have large width so as to correspond to the second fixed plate portion 52 and the third fixed plate portion 54.

In the present embodiment, the attachment plate 22 is provided with the bent portion 134, the upper side wall 30 of the tubular body 20 is fixed directly to the attachment plate 22, and the other side walls 32, 34, 36 of the tubular body 20 are fixed to the attachment plate 22 via the single bracket 132. Thus, the advantageous effects similar to those in the above-described embodiment are obtained, for example, the one end portion of the tubular body 20 is fixed with a high positioning strength in a state where the one end portion abuts against the attachment plate 22. In addition, the tubular body 20 is appropriately fixed with the use of the single bracket 132, and thus the number of components is further decreased, which leads to manufacturing cost reduction.

Figure 15:
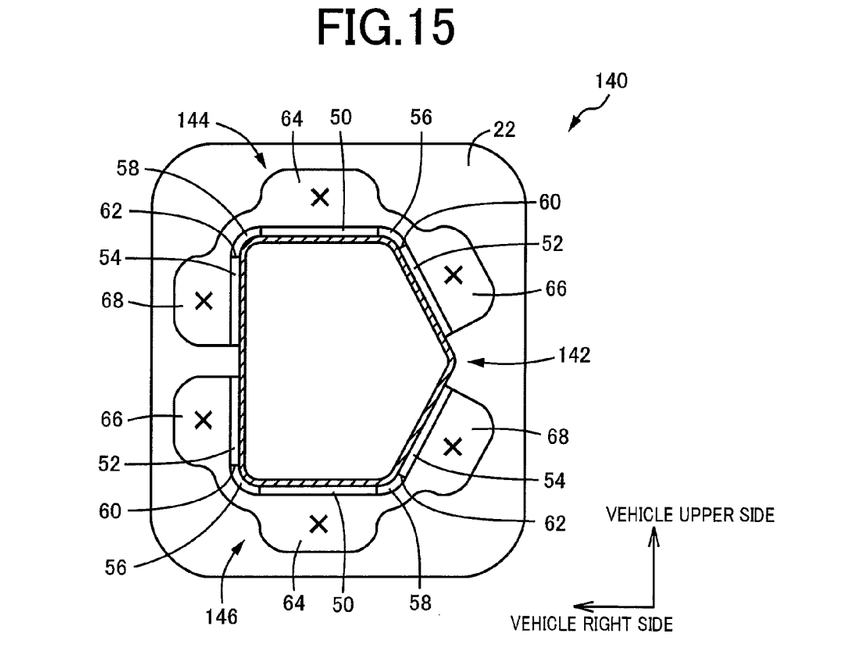
FIG. 15 is a sectional view illustrating a yet further embodiment of the invention, the view corresponding to FIG. 3.
Figure 16:
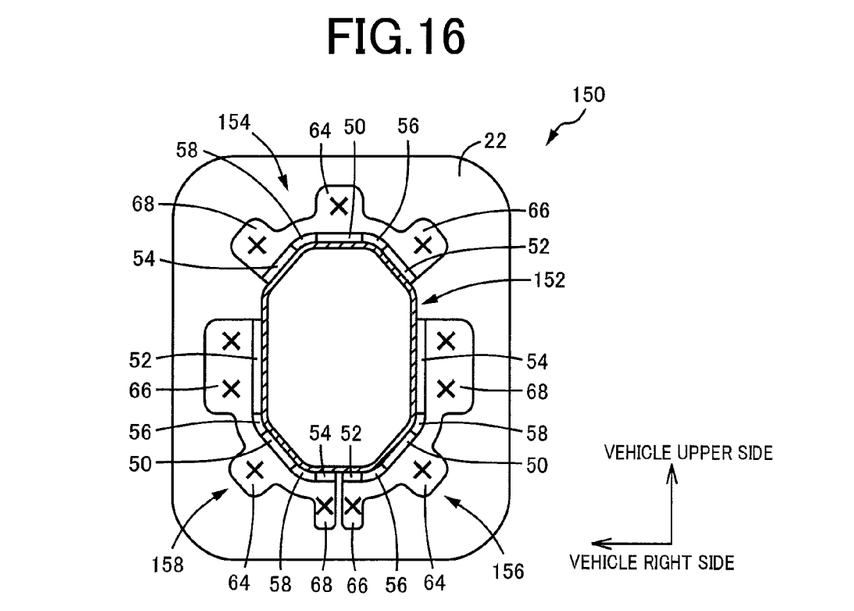
FIG. 16 is a sectional view illustrating still another embodiment of the invention, the view corresponding to FIG. 3.
Figure 17:
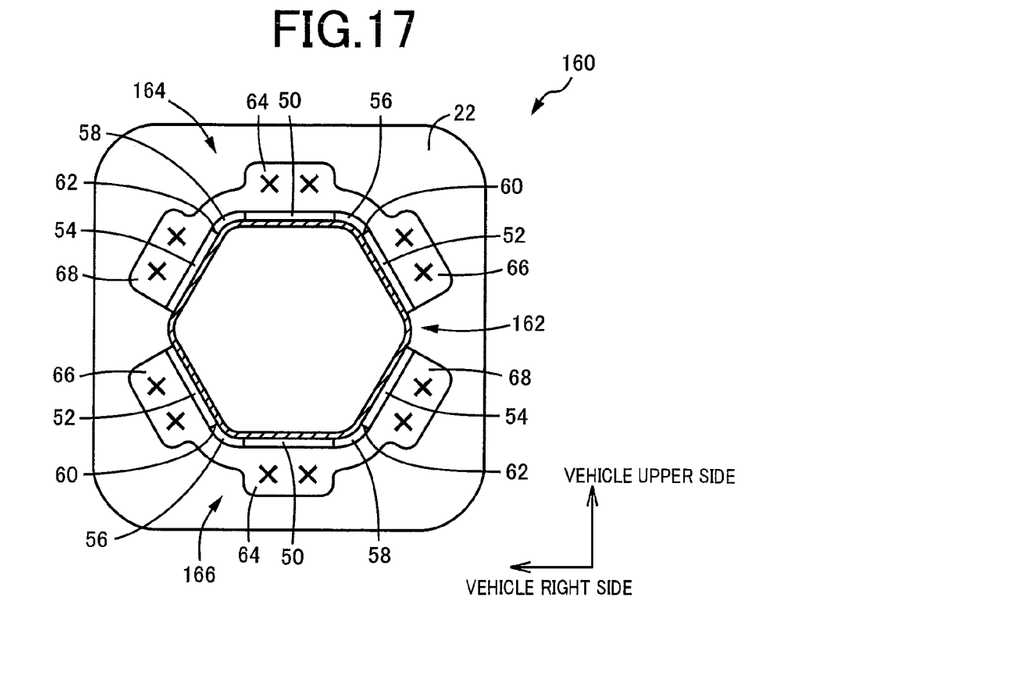
FIG. 17 is a sectional view illustrating yet another embodiment of the invention, the view corresponding to FIG. 3.

FIG. 15 to FIG. 17 are each a sectional view corresponding to FIG. 3, and are each different from the above-described embodiment in a sectional shape of a tubular body. A crush box 140 in FIG. 15 has a tubular body 142 that has a pentagonal sectional shape, and is fixed to the attachment plate 22 via a pair of brackets 144, 146. The brackets 144, 146 are basically the same as the brackets 40, 42, and each have three fixed plate portions, that is, a first fixed plate portion 50, a second fixed plate portion 52, and a third fixed plate portion 54. Corner portions 56, 58, at which cuts 60, 62 are formed, are located between the first fixed plate portion 50 and the second and third fixed plate portions 52, 54. The brackets 144, 146 are each fixed over three side walls of the tubular body 142.

A crush box 150 in FIG. 16 has a tubular body 152 that has a octagonal sectional shape, and is fixed to the attachment plate 22 via three brackets 154, 156, 158. The brackets 154, 156, 158 are basically the same as the brackets 40, 42, and each have three fixed plate portions, that is, a first fixed plate portion 50, a second fixed plate portion 52, and a third fixed plate portion 54. Corner portions 56, 58, at which cuts 60, 62 are formed, are located between the first fixed plate portion 50 and the second and third fixed plate portions 52, 54. The brackets 154, 156, 158 are each fixed over three side walls of the tubular body 152.

A crush box 160 in FIG. 17 has a tubular body 162 that has a hexagonal sectional shape, and is fixed to the attachment plate 22 via a pair of brackets 164, 166. The brackets 164, 166 are basically the same as the brackets 40, 42, and each have three fixed plate portions, that is, a first fixed plate portion 50, a second fixed plate portion 52, and a third fixed plate portion 54. Corner portions 56, 58, at which cuts 60, 62 are formed, are located between the first fixed plate portion 50 and the second and third fixed plate portions 52, 54. The brackets 164, 166 are each fixed over three side walls of the tubular body 162.

Figure 18:
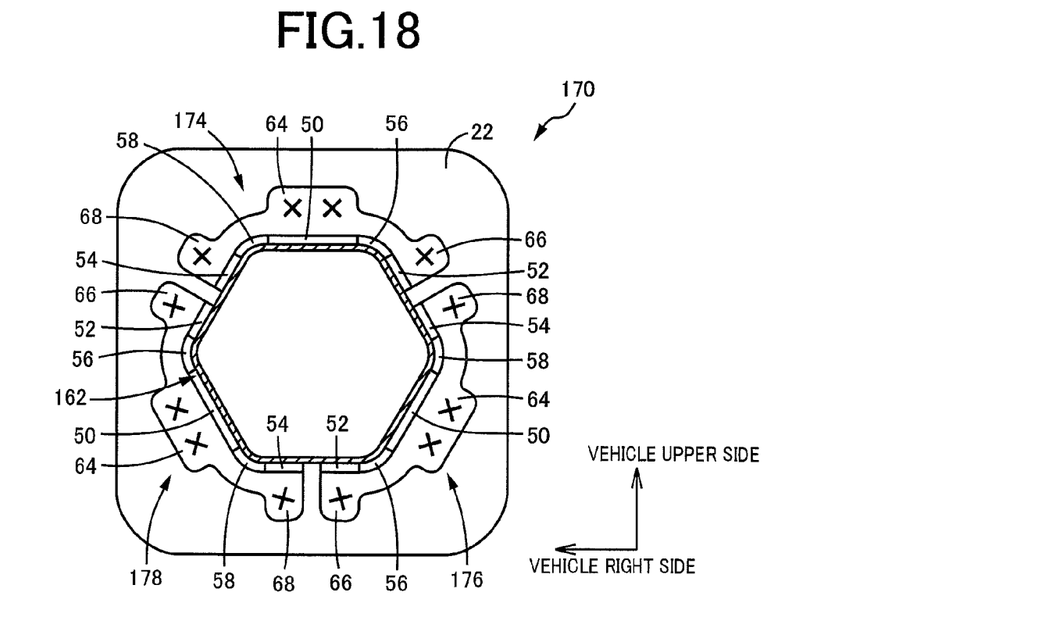
FIG. 18 is a sectional view illustrating a still further embodiment of the invention, the view corresponding to FIG. 3.

A crush box 170 in FIG. 18 has the tubular body 162 that has a pentagonal sectional shape as the crush box 160 in FIG. 17, and is different from the crush box 160 in that the tubular body 162 is fixed to the attachment plate 22 via three brackets 174, 176, 178. The brackets 174, 176, 178 are basically the same as the brackets 40, 42, and each have three fixed plate portions, that is, a first fixed plate portion 50, a second fixed plate portion 52, and a third fixed plate portion 54. Corner portions 56, 58, at which cuts 60, 62 are formed, are located between the first fixed plate portion 50 and the second and third fixed plate portions 52, 54. The brackets 174, 176, 178 are each fixed over three side walls of the tubular body 162.

While example embodiments of the invention have been described in detail with reference to the drawings, each of the example embodiments is merely one mode for carrying out the invention. The invention may be implemented in various modes achieved by making various changes and improvements based on the knowledge of a person skilled in the art.

NOMENCLATURE OF ELEMENTS

12R, 12L: side member (vehicle body-side member) 14R, 14L, 80, 100, 130, 140, 150, 160, 170: crush box (vehicular impact absorber) 20, 82, 142, 152, 162: tubular body 22: attachment plate (vehicle body-side attachment plate) 30: upper side wall 32: lower side wall 34, 36: lateral side walls 31, 33, 35, 37: ridge portions 40: first bracket 42: second bracket 44, 110: fixed plate portion 46, 112: connecting plate portion 50: first fixed plate portion 52: second fixed plate portion 54: third fixed plate portion 56, 58, 118: corner portions 60, 62, 120: cuts 64: first connecting plate portion 66: second connecting plate portion 68: third connecting plate portion 70, 72: connection portions 102, 104, 106, 108, 132, 144, 146, 154, 156, 158, 164, 166, 174, 176, 178: brackets

The invention claimed is:

1. A vehicular impact absorber comprising:
a hollow tubular body having a plurality of flat plate-shaped side walls and having a polygonal section; and a vehicle body-side attachment plate that is fixed integrally with the tubular body via a bracket in a state where the vehicle body-side attachment plate is in contact with one end portion of the tubular body in an axial direction, the vehicular impact absorber being fixed at the vehicle body-side attachment plate to a vehicle body-side member, and the vehicular impact absorber absorbing impact energy as the tubular body is crushed in the axial direction when an impact load is applied to the tubular body through the other end portion of the tubular body in the axial direction, the vehicular impact absorber being configured such that
the bracket has
a fixed plate portion that has a prescribed length in the axial direction of the tubular body, that is disposed so as to be in close contact with and fixed integrally with outer faces of the plurality of side walls located adjacent to each other across a ridge portion of the tubular body, and that has a corner portion bent so as to conform to the ridge portion of the tubular body, and
a connecting plate portion that is bent from an end portion of the fixed plate portion, the end portion being located on the one end portion side of the tubular body in the axial direction, outward in a direction away from the tubular body, and the connecting plate portion being fixed integrally with the vehicle body-side attachment plate, and
a cut that is open toward the other end portion side of the tubular body in the axial direction is formed at the corner portion.

2. The vehicular impact absorber according to claim 1, wherein
the fixed plate portion has a first fixed plate portion fixed to a first side wall of the tubular body and a pair of a second fixed plate portion and a third fixed plate portion fixed respectively to a pair of a second side wall and a third side wall located adjacent to opposite sides of the first side wall across the ridge portions, and the cuts are formed respectively at a pair of the corner portions respectively located between the first fixed plate portion and the pair of the second and third fixed plate portions, and
the connecting plate portion has a first connecting plate portion bent outward from the first fixed plate portion and a pair of a second connecting plate portion and a third connecting plate portion respectively bent outward from the pair of the second fixed plate portion and the third fixed plate portion, and the first connecting plate portion and the pair of the second and third connecting plate portions are fixed integrally with each other via connection portions formed so as to be continuous from the corner portions.

3. The vehicular impact absorber according to claim 2, wherein
the tubular body has a rectangular section with right angles, the tubular body having an upper side wall that is disposed substantially horizontally at a position on an upper side in a vehicle-height direction when the tubular body is mounted in a vehicle, and a lower side wall that is disposed substantially horizontally at a position on a lower side in the vehicle-height direction when the tubular body is mounted in the vehicle, and the tubular body having a pair of lateral side walls extending in an up-down direction and located respectively on right and left sides of the upper side wall and the lower side wall,
the bracket includes a first bracket of which the fixed plate portion is fixed over the upper side wall of the tubular body and upper portions of the pair of the lateral side walls of the tubular body and a second bracket of which the fixed plate portion is fixed over the lower side wall of the tubular body and lower portions of the pair of the lateral side walls of the tubular body,
the tubular body is fixed to the vehicle body-side attachment plate with use of the first bracket and the second bracket, and
each of the upper side wall and the lower side wall is the first side wall, and the pair of the lateral side walls is the pair of the second side wall and the third side wall.

\* \* \* \* \*